United States Patent [19]

Whiteside et al.

[11] Patent Number: 4,608,009
[45] Date of Patent: Aug. 26, 1986

[54] THERMOFORMING EQUIPMENT FOR DIFFERENTIAL PRESSURE FORMING PRODUCTS IN THERMOPLASTIC MATERIAL

[75] Inventors: Robert C. Whiteside, Harrison; Albert W. Arends, Gladwin, both of Mich.

[73] Assignee: John Brown Inc., Beaverton, Mich.

[21] Appl. No.: 613,864

[22] Filed: May 23, 1984

[51] Int. Cl.⁴ .................. B29C 51/36; B29C 51/44
[52] U.S. Cl. .................. 425/590; 264/153; 264/334; 264/551; 425/292; 425/388; 425/405 R; 425/422; 425/451.6; 425/451.7; 425/592; 425/593
[58] Field of Search .......... 425/145, 161, 162, 292, 425/324.1, 327, 347, 388, 395, 397, 405 R, 422, 451, 451.2, 451.5, 451.6, 589, 590, 592, 593, 451.3; 264/153, 334, 549–551, 553

[56] References Cited

U.S. PATENT DOCUMENTS

| | | | |
|---|---|---|---|
| 3,105,270 | 10/1963 | Fibish | 425/145 |
| 3,166,790 | 1/1965 | Keyes | 425/302.1 |
| 3,173,174 | 3/1965 | Edwards | 425/292 |
| 3,216,491 | 11/1965 | Brown et al. | 165/161 |
| 3,338,997 | 8/1967 | Tigner | 264/549 |
| 3,346,923 | 10/1967 | Brown et al. | 425/162 |
| 3,507,007 | 4/1970 | Martin | 425/388 |
| 3,561,057 | 2/1971 | Butzko | 425/214 |
| 3,577,596 | 5/1971 | Bullard et al. | 425/151 |
| 3,585,689 | 6/1971 | Brown et al. | 425/157 |
| 3,719,445 | 3/1973 | Sindelar | 425/150 |
| 3,726,458 | 4/1973 | Rabl | 226/146 |
| 3,830,611 | 8/1974 | Irwin | 425/415 |
| 3,876,488 | 4/1975 | Uemura et al. | 156/405 |
| 3,890,308 | 6/1975 | Collins | 425/242 |
| 4,158,539 | 6/1979 | Arends et al. | 425/451.4 |
| 4,308,005 | 12/1981 | Zundel | 425/388 |
| 4,354,816 | 10/1982 | Schepp | 425/388 |
| 4,368,024 | 1/1983 | Asano | 425/388 |
| 4,377,377 | 3/1983 | Arends et al. | 425/451.2 |
| 4,428,723 | 1/1984 | Thiel et al. | 425/324.1 |

Primary Examiner—Jay H. Woo
Assistant Examiner—Timothy W. Heitbrink
Attorney, Agent, or Firm—Learman & McCulloch

[57] ABSTRACT

Improvements in differential pressure, thermoforming machinery for molding articles in thermoplastic material wherein a mold station incorporates female mold mechanism and opposed mold mechanism, a web advancing mechanism indexes a plastic web in which products are to be formed between said mold mechanisms, a drive moves the female and opposed mold mechanisms between open and closed positions on opposite sides of the plastic web, severing knife means is cooperable with a final increment of said relative movement to dispose said mechanism in closed position to sever the products formed from the web, and ejector mechanism is operable after severing is accomplished and there has been relative movement of said mold mechanisms toward open position to eject the product.

13 Claims, 12 Drawing Figures

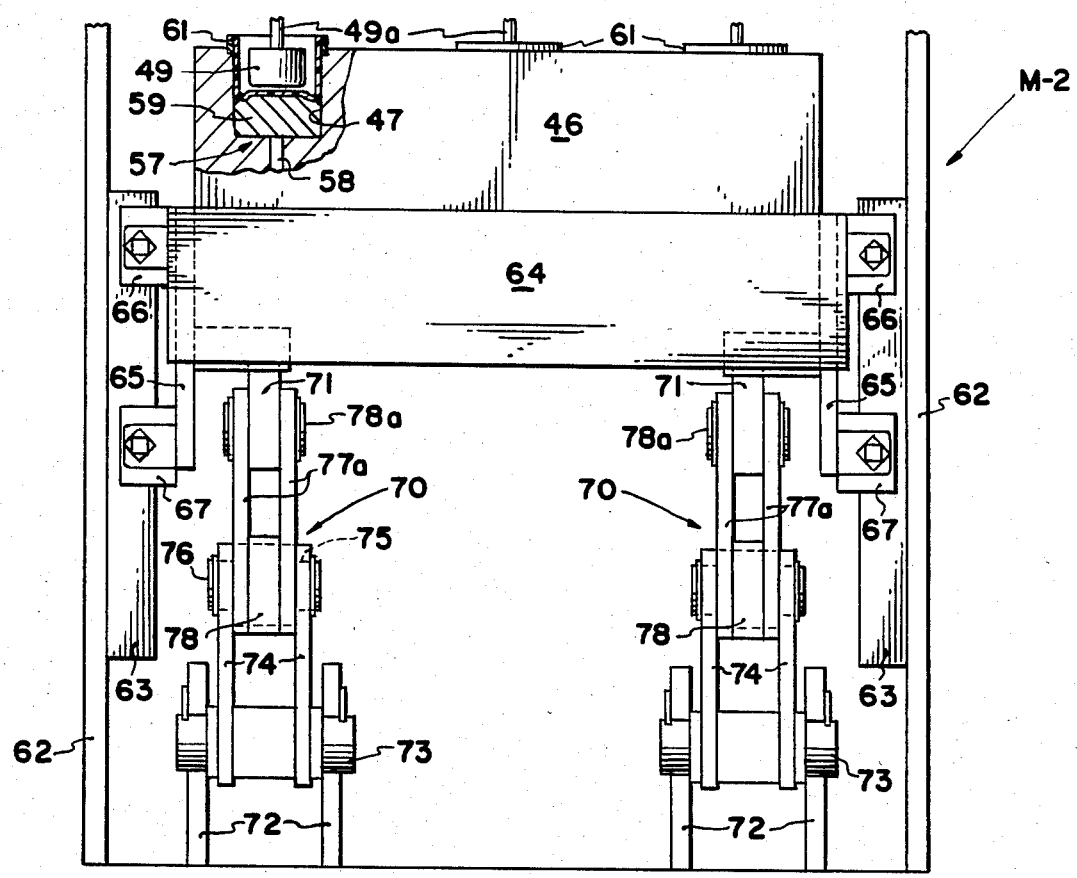
FIG.4
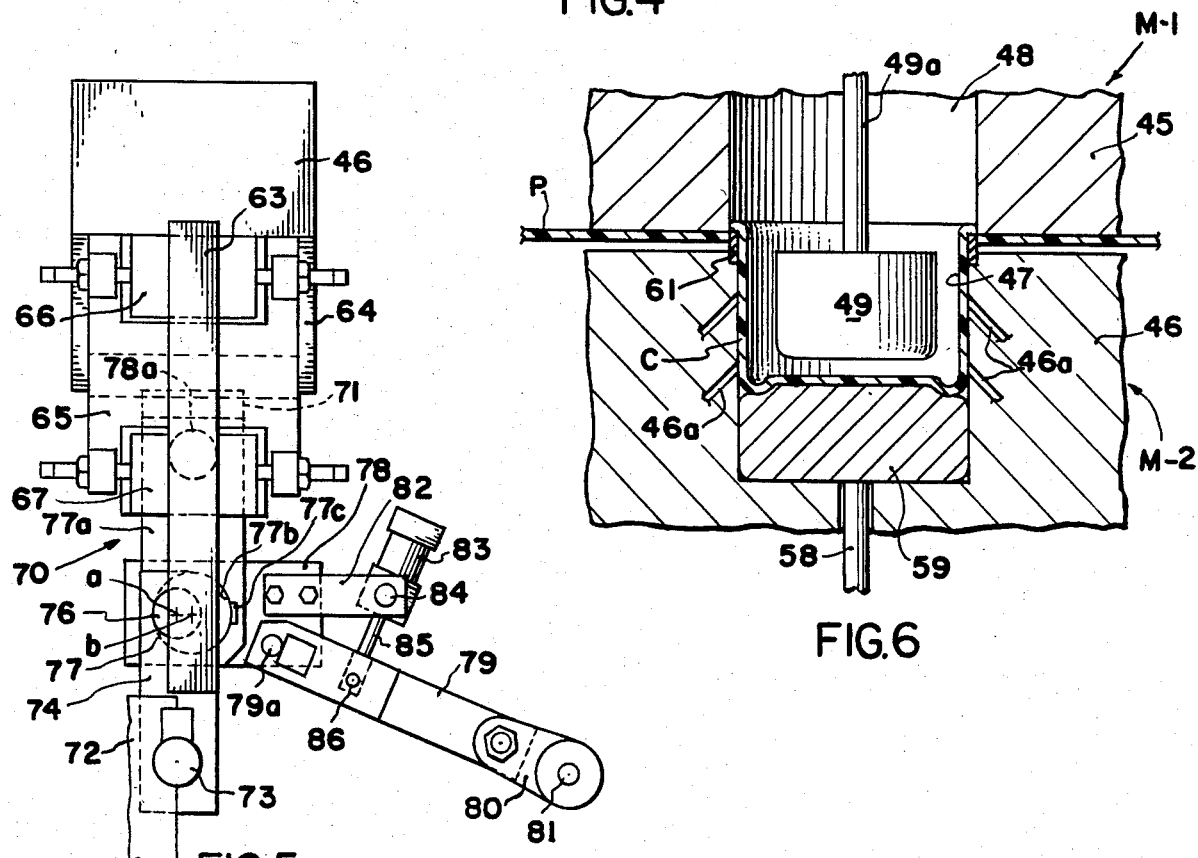
FIG.5
FIG.6

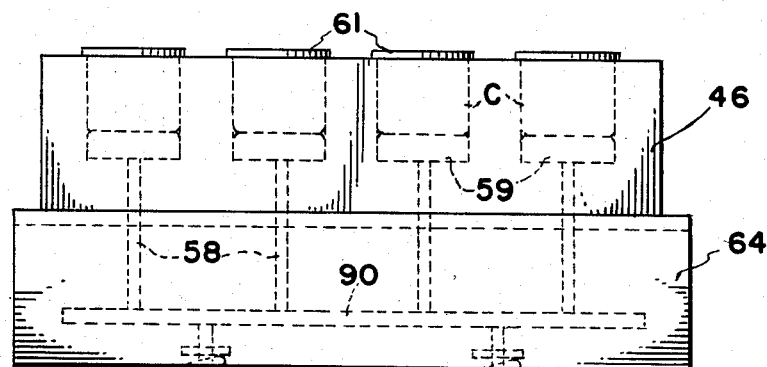
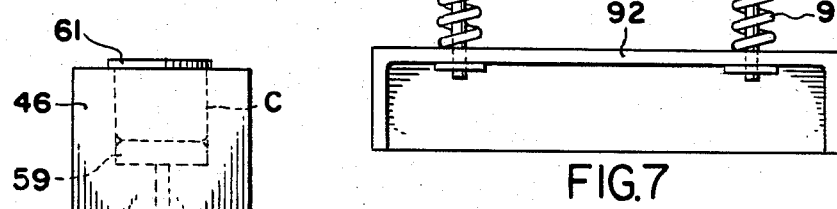
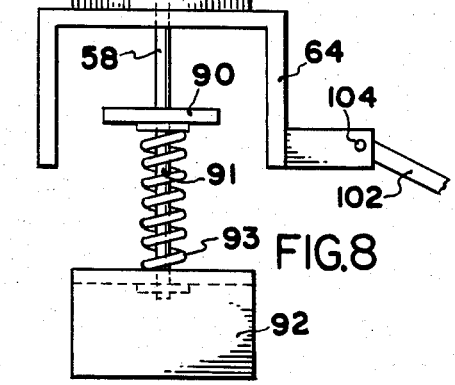
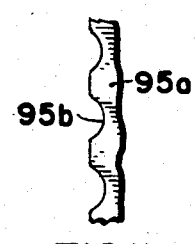
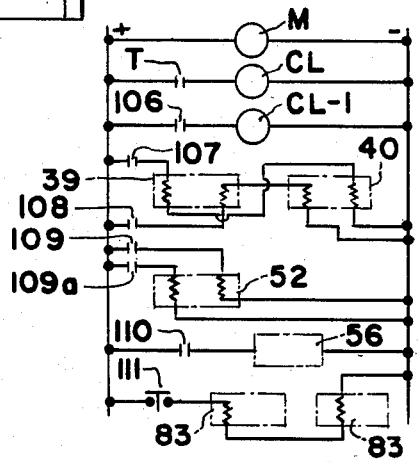
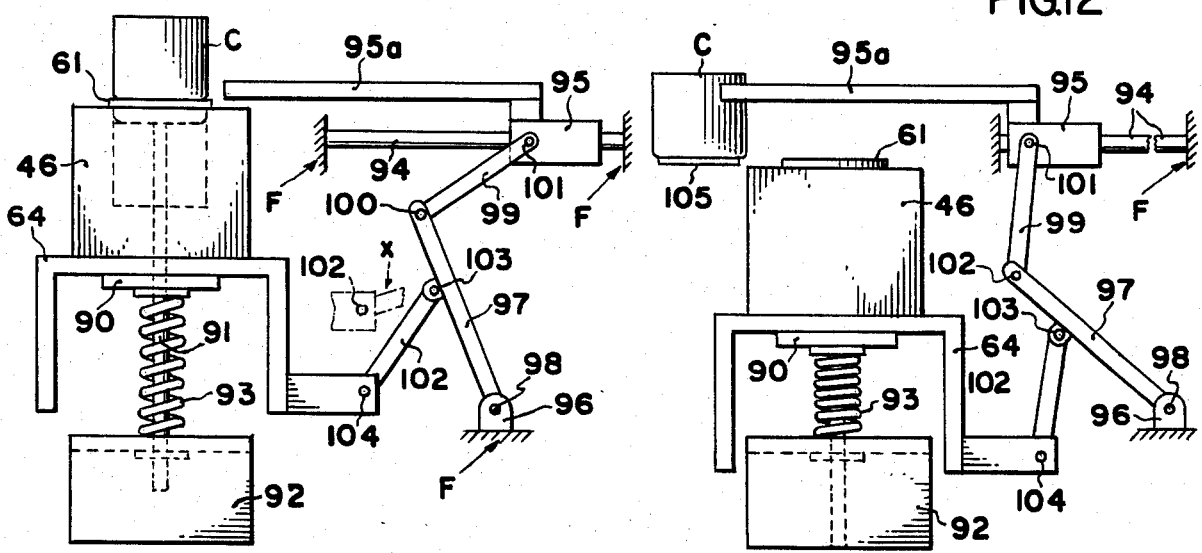
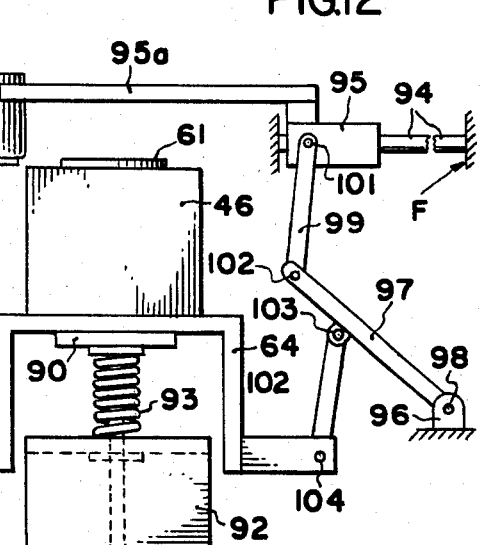

THERMOFORMING EQUIPMENT FOR DIFFERENTIAL PRESSURE FORMING PRODUCTS IN THERMOPLASTIC MATERIAL

BACKGROUND OF THE INVENTION

The thermoforming art is well developed and normally such machinery includes mold carrying platens driven cyclically in relative movement toward and away from each other between open and closed positions to thermoform plastic parts on a mass production basis. Various machines have been proposed to satisfy various of the requirements for efficient and reliable thermoforming machines, and among them are machines incorporating some of the features disclosed in the following U.S. Pat. Nos.:

U.S. Pat. Nos. 3,105,270; 3,726,458; 3,216,491; 3,876,488; 3,338,997; 4,354,816; 3,346,923; 4,368,024; 3,577,596; 3,890,308; 3,719,445; 4,158,539.

Improvements in such systems have been generally concerned with efforts to increase the productivity of such machinery and to operate it at ever-faster speeds to turn out products at an ever-increasing pace. Much of the machinery which is in use is of a relatively heavy and complex nature and a need has been identified for smaller thermoforming systems which are, for instance, capable of the "trim-in-place" processing of polypropylene and other thermoplastic materials. A thermoformer of this type may, for example, provide a maximum mold size of 20×13 inches with a 5 inch depth of draw. Such a machine will handle 22 inches×30 inch diameter rolls of material in thicknesses up to 2 mm., at operating speeds of as much as 40 strokes per minute.

SUMMARY OF THE INVENTION

Systems of the type which we have designed require that the material be efficiently and reliably pulled from the supply roll and advanced between the molds at speeds consonant with the mold cycles utilized. Such systems further require drive mechanism for moving the molds relatively to provide a "trim-in-place" feature, and to do so conjunctively with a "no-trim" mechanism which will effectively disable the trim movement on a selective basis. Such systems also require mechanism for synchronously removing the products which are separated from the web from between the molds to a collection station in an advantageous and reliable manner.

Finally, systems of this type must provide other operating advantages which enhance the saleability of such machines in various countries throughout the world.

One of the prime objects of the present invention is to design a relatively smaller and yet efficient machine which is still capable of producing parts at relatively high speeds in a manner which enhances the productivity, performance and profitability of such machinery.

Still another object of the invention is to provide an extremely versatile machine of relatively inexpensive construction which is well suited to the world market for such machines.

Still another object of the invention is to provide dancer mechanism for thermoforming equipment which is not subject to the extremes of acceleration and deceleration which were a characteristic of prior designed machinery, and which, accordingly, avoids the problems previously encountered as a result.

A further object of the invention is to provide dancer roll drive mechanism which operates efficiently and smoothly, avoids tearing of the thermoplastic sheet and undue jarring and the consequent wear of the machine parts, and does so without sacrificing cycle time.

Still another object of the invention is to provide very efficient drive mechanism for moving at least one of the mold members relative to the other which provides a part "trim-in-place" feature while still permitting an effective "no-trim" control which provides for the optional and selective disablement of the "trim-in-place" increment of travel.

Still another object of the invention is to design simple and effective product ejecting mechanism operated via the movement of at least one of the molds to a spread, moldopen position to move parts trimmed from the web and ejected from the mold cavities, over to a collection station.

Other objects and advantages of the invention will become apparent by reference to the following specification and to the drawings.

IN THE DRAWINGS

FIG. 4 is a considerably enlarged, fragmentary transverse elevational view illustrating the drive link mechanism for moving the lower mold platen upwardly and downwardly;

FIG. 5 is a side elevational view thereof;

FIG. 6 is a still more enlarged, sectional elevational view, particularly illustrating "trim-in-place" knives which may be used with the machinery;

FIG. 7 is a fragmentary, end elevational view, particularly illustrating the ejector members for moving the trimmed products out of the mold cavities;

FIG. 8 is a schematic side elevational view thereof;

FIG. 9 is a fragmentary, schematic side elevational view illustrating pusher mechanism linkage for removing the trimmed parts in an advanced position;

FIG. 10 is a view similar to FIG. 9, but showing the part displacing pusher moved to fully displaced position between the upper and lower molds to push the parts ejected from the mold cavities over to a part collecting conveyor;

FIG. 11 is a fragmentary, top plan view of a portion of the pusher plate; and

FIG. 12 is a typical electrical control diagram.

THE GENERAL MACHINE

Figure 1:
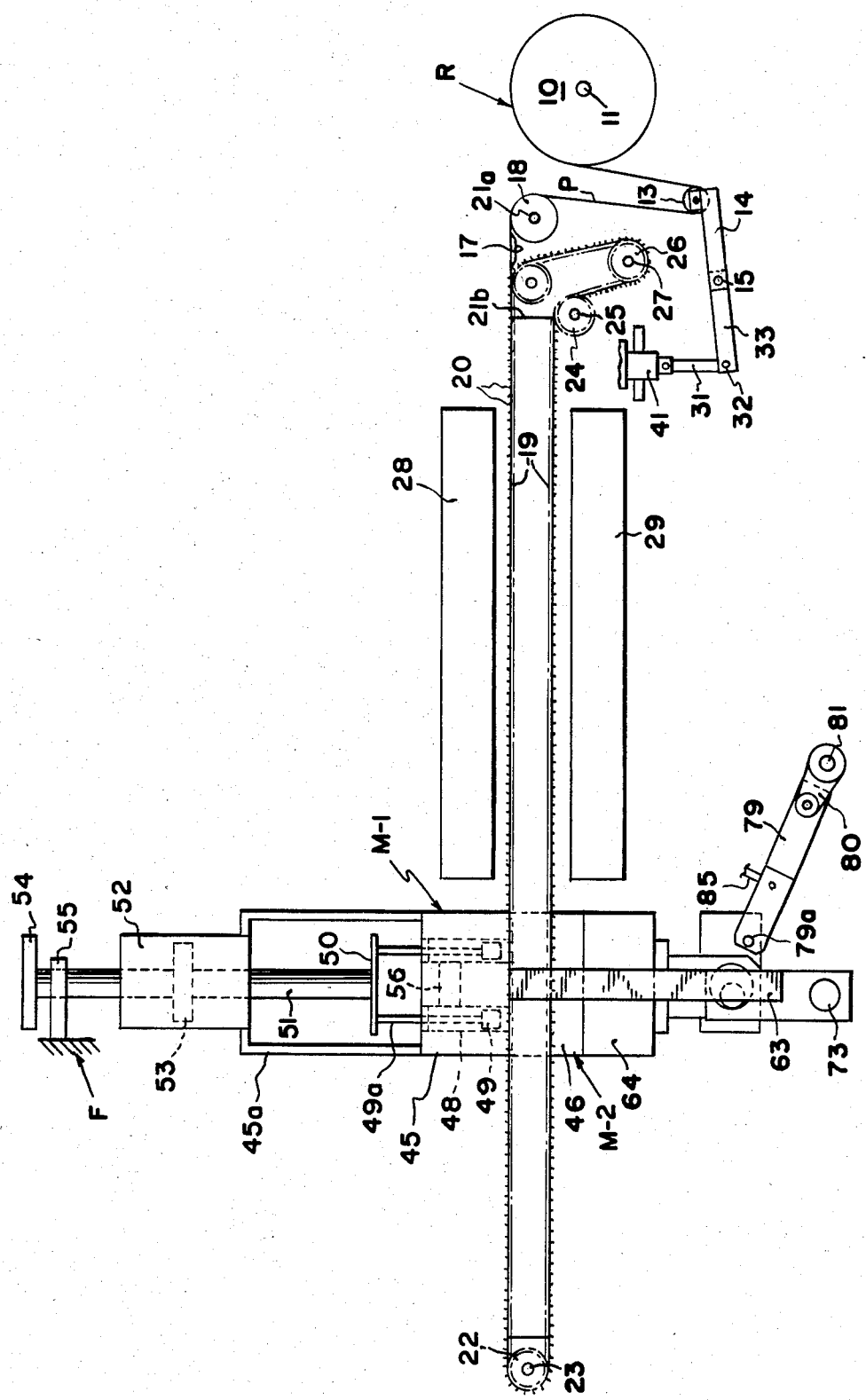
FIG. 1 is a schematic, side elevational view of a thermoforming system employing the improvements of the invention.

Referring now more particularly to the accompanying drawings, and in the first instance to FIG. 1, thermoplastic materials such as polypropylene, polyethylene, and polystyrene are supplied in the form of a wound roll, generally designated R, which in the usual manner is supported for rotation on supports 11a on shaft 11, which, in the usual manner, is journaled in bearings 11b (see FIG. 2) supported on the machine frame F. The machine frame is shown only fragmentarily as comprising end and side rails 8 and 9 respectively, supported on legs 12.

Figure 2:
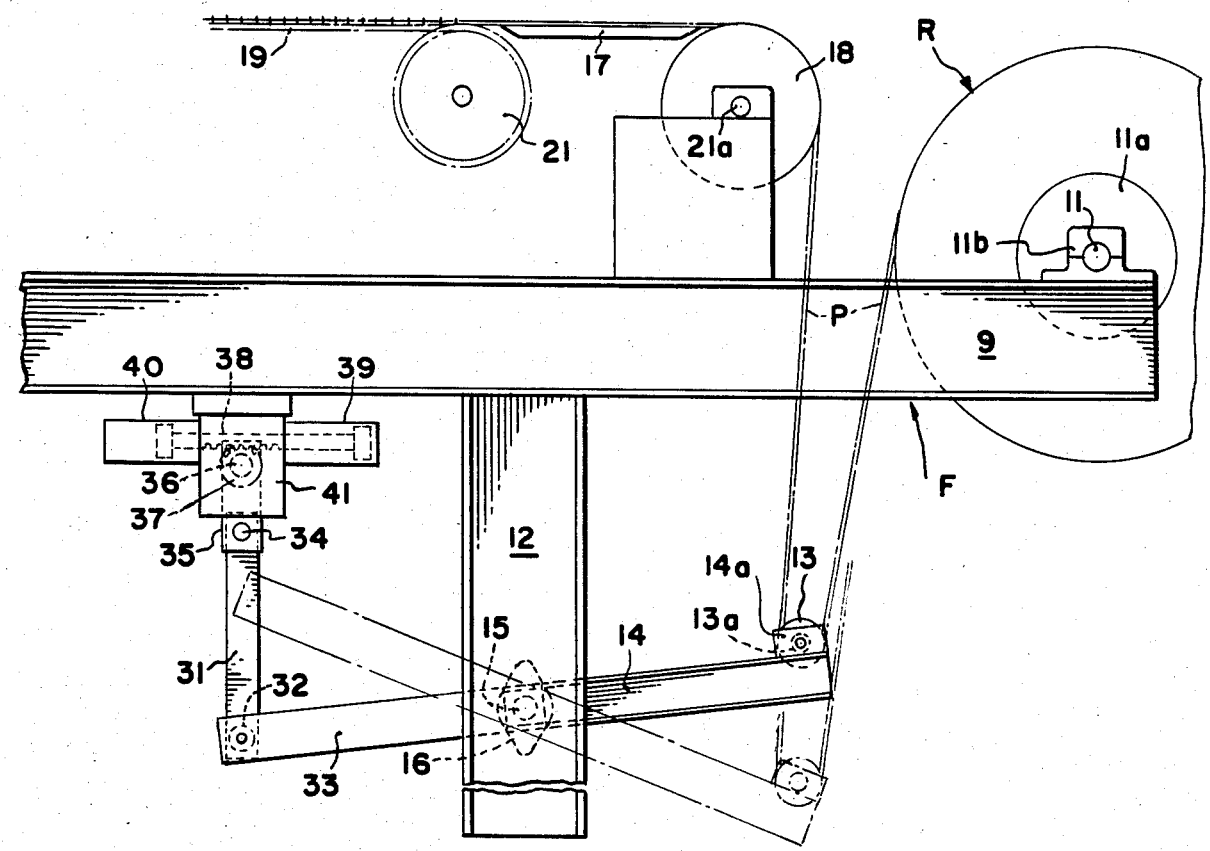
FIG. 2 is a greatly enlarged, fragmentary view showing a dancer roll in several positions, the chain lines indicating the extended position of the dancer roll in which the roll operates to pull a length of material from the plastic roll preparatory to feeding it between the ovens in increments to a position between the thermoforming molds.

The plastic web or sheet P is shown in FIG. 2, in chain lines, as having been pulled from the roll R by a dancer roll 13, mounted on arms 14 which are pivotally supported by a shaft 15 which is journaled in bearings 16 on frame legs 12. The dancer roll assembly will presently be described in more detail.

The plastic web P leads around under the dancer roll 13, and up over roll supports 18. As is usual, and described in the present assignees' U.S. Pat. No. 3,216,491, which is incorporated herein by reference, advancing chains 19 provided with piercing pins 20 at each side of the machine, then engage the edges of the plastic web P, and pierce them to grip the web and enable the chains to move the sheet in indexing increments.

The chains 19, which receive the web from a bridging web support pan 17, may be trained around sprockets 21 mounted on shaft 21a, side rails 21b and downstream sprockets 22 mounted on an idler shaft 23. The chains 19 also train around sprockets 24, mounted on an idler shaft 25, and chain drive sprockets 26 mounted on the chain drive shaft 27 which is powered by suitable Geneva mechanism or the like, to move the chains 20 in advancing increments in the conventional manner. The drive shaft 27 is driven synchronously with the mold platen closing and opening drive mechanism to advance the next increment of plastic web P between the molds of the thermoforming machine when the molds are in spread position.

Provided in the usual manner to heat the thermoplastic web P to a deformable condition are temperature controlled upper and lower ceramic heater ovens 28 and 29, respectively, situated between the dancer roll 13 and the upper and lower mold assemblies generally designated M-1 and M-2 respectively, generally. As will become apparent when the mold station elements are described in more detail, the upper mold assembly M-1 is stationary and it is the lower mold assembly M-2 which is moved upwardly and downwardly with respect to it.

THE DANCER MECHANISM

Figure 3:
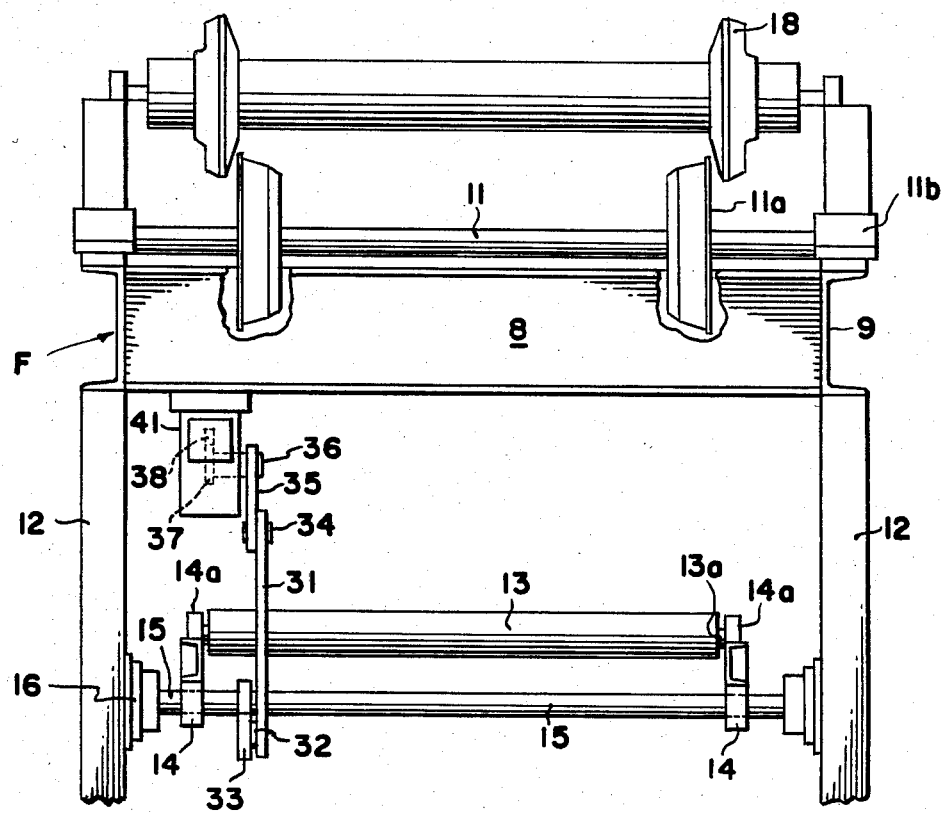
FIG. 3 is a fragmentary, front elevational view thereof.

As FIGS. 2 and 3 particularly indicate, the dancer roll support arms 14 are fixed at their front ends to a shaft 15 and the roll 13 is oscillated in the arcuate path indicated in FIG. 2 by a connecting rod 31. At its lower end, rod 31 is pivotally connected as by pin 32 to a forwardly extending link 33 which is fixed to shaft 15. At its upper end, connecting rod 31 is connected via a pivot pin 34 with a vertically extending drive member or crank 35, which is swung through a 180° arc, and then back again. The drive crank 35 is fixed to a drive shaft 36 on which a spur gear 37 is keyed. Provided to drive the gear 37 first in one direction of rotation and then in the other is a rack gear 38. The rack gear 38 is driven in opposite directions by opposed fluid pressure operated cylinders 39 and 40 having floating pistons provided in opposed relation. When air is admitted to the ends of cylinder 39 to drive the rack 38 to the left in FIG. 2, air must be egressed from the far end of the cylinder 40 to permit this to happen, and vice versa when rack 38 is returned. A bracket 41 may be provided for supporting the cylinders 39 and 40 from frame rails 9.

As will be apparent from FIG. 2, the support arms 14, which have brackets 14a journaling the dancer roll shaft 13a, move through about 25° of travel and then swing back. What is achieved is a relatively rapid pay-out of material from the roll R, then a rapid movement of dancer roll 13 upwardly so that the chains 20 can synchronously index the web. The roll 13 moves with such speed that the material can index without delay and the indexing is completed when roll 13 reaches the "up" position.

Previous mechanism employing air cylinders to directly power the dancer roll support arms created problems because of the acceleration and deceleration extremes. Now, with crank 35 swinging 180°, and operating through connecting rod 31, a controlled acceleration and deceleration is built in and the shock effects of acceleration and deceleration are much mitigated.

THE MOLD STATION

As FIG. 1 indicates, the upper mold assembly M-1 is stationary and includes a mold member 45 supported on frame F opposite the mold assembly M-2 which includes the usual mold member 46, with a series of mold cavities 47. The upper mold assembly M-1 has openings 48 for the plug assist members 49, which, as FIG. 4 indicates, are movable down into mold cavities 47 to assist in moving portions of the plastic web P into the cavities. The plug assists 49 may be mounted on rods 49a, attaching to a support plate 50 which is connected to the piston rod 51 of an airoperated cylinder 52, housing a piston 53. Supports 45a may be provided for supporting the cylinder 52 on mold member 45. Cylinder 52 is a double-acting cylinder, which has its piston rod 51 extending from both ends, and the upper end of rod 51 mounts a stop plate 54, which is movable down into engagement with the frame supported stop 55.

It is to be understood that the plug assists 49 operated in conjunction with an air pressure supplying valve and manifold device 56, which, after the plug assists 49 have moved the plastic P into the cavities 47, provides the air pressure to intimately engage the plastic with the contours of the mold cavities. Vacuum ports 46a can also be provided in the mold 46 in the usual manner. As FIG. 4 indicates, the lower end of each mold cavity 47 is formed by an ejector pin assembly, generally designated 57, which includes ejector pins 58, to presently be described with respect to their operation in more detail, and ejector pin heads 59 which provide the desired configuration for the bottom of the mold cavities 47.

As shown more particularly in FIG. 6, a steel ring die 61 may be fixed in position by the mold 46 to form the upper end of each mold cavity 47. As FIG. 6 indicates, each ring 61 is a severing or cut-off knife which is effective to sever the cup-shaped part C which has been formed in the molding operation from the plastic web P.

Provided on frame support members 62, at the mold station, are a pair of ways or guides 63 on which a platen 64 (which carries mold 46) is guided during raising and lowering movement. Supporting plates 65 are provided on the ends of platen 64 for the purpose of mounting bearing blocks or gibs 66 and 67 which travel along the ways 63.

The platen 64 is raised and lowered by toggle linkage assemblies generally designated 70, which are of a unique nature to provide for both a final upward incremental movement of mold 46 and severing rings 61, and for a selectively operated, "no-trim" repositioning operation. The toggle linkage is driven in a scissors fashion to expand and retract, and thereby move the platen 64 and mold 46 upwardly and downwardly in the thermoforming cycle.

Each toggle link assembly 70 is connected to the platen 64 by a bar 71, and is connected to the frame F at its lower end by a pin 73 supported by a pair of frame support brackets 72. The toggle links 74 of each assembly 70 are pivotally mounted on a frame-fixed pin 73 and, at their upper ends, each pair of links 74 is provided with co-axial bores 75 which support the co-axial ends of a pin 76 having an enlarged eccentric central part 77 (FIG. 5). The ends of pin 76 have an axis a and the portion 77 has an axis b. The upper toggle links 77a for each assembly 70 are each connected to the platen 64 by a pivot pin 78a carried by the bars 71, and at their lower ends have bores 77b which journal the eccentric portions 77. Keyed to each portion 77 as at 77c is a block 78 on one end of which a connecting rod 79 is pivoted, as by a pin 79a. The connecting rod 79 for each assembly 70 is driven by a crank arm 80 mounted on a drive shaft 81 for moving the crank arms 80 through 360° increments of rotation.

Projecting from each block 78 are braces 82 for pivotally mounting a spring returned, single-acting cylinder 83, as with a pin 84. The piston rod 85 of each cylinder 83, is pinned as at 86 to connecting rod 79. As will later become apparent, cylinders 83 may be push button operated by the machine operator to bring a "no-trim" repositioning into play.

The purpose of eccentric pins 76 is to provide a final increment of upward movement of mold 46 via eccentric portions 77 at the beginning of the mold retract cycle, after a short time delay to permit cooling of the parts C which are formed. Drive shaft 81 may be driven via a suitable electric motor M through suitable Geneva mechanism or the like (not shown), such that crank arms 80 are indexed in a manner which later will be described.

THE PART EJECTING MECHANISM

FIGS. 7–10 schematically depict the mechanism for, first of all, moving the parts C upwardly out of the mold cavities 47 and, then, pushing them laterally to a position removed from between the mold assemblies M-1 and M-2. For the purposes of convenience of illustration, the mold 46 has been shown as only of sufficient width to produce a single row of cups C in these Figures. In FIGS. 7 and 8 the ejector pins 58 are shown as connected by a plate 90. The plate 90 mounts receiving guide rods 91 which pass through openings in the plate 92 (which is attached to the frame F). Coil springs 93 are provided around the pins 91 to restrain the plate 90 and ejector pins 58 when the platen 64 moves downwardly.

The upper ends of springs 93 are normally disposed a predesignated distance below the plate 90, as shown in FIG. 7. When mold 46 initially lowers, the ejector pin assembly 57 will lower with it for a sufficient portion of the mold's travel to clear the sag in the sheet. Then, when plate 90 contacts springs 93, mold 46 will continue to lower, while the springs 93 maintain the heads 59 of the pin assemblies in position such that the parts C are soon positioned above the mold cavities 47 and die rings 61.

In FIG. 9, mechanism is disclosed for moving such cups C out from between the mold assemblies M-1 and M-2. Provided at each side of the machine, downstream from the mold assemblies M-1 and M-2, are a pair of guide rods 94 which mount pusher plate carriages 95 to which a pusher plate 95a is connected. Brackets 96 on the frame F are provided at each side of the machine to support pivotal links 97 via pivot pins 98. Each arcuately oscillating link 97 is connected with a carriage 95 via a link 99, and pivot pins 100 and 101. Each link 97 is connected with the platen 64 via a link 102, and pivot pins 103 and 104.

The linkage is uniquely designed so that initial downward movement of the platen 64 creates no substantial forward movement of the pusher plate 95a. It is only when link 102 travels from the position shown in FIG. 8 to the position shown in broken lines at x in FIG. 9, that material forward movement of plate 95a commences. The built-in time delay provides sufficient time for the cups C to clear the cavities 47 and rings 61 before pusher plate 95a is moved across.

In the advanced position of the pusher plate 95a, which is reached automatically when the platen 64 is lowered to the position shown in FIG. 10, the parts or cups C are engaged by the pusher 95a and moved over to a collection station which may comprise, for example, a transversely moving belt conveyor 105. FIG. 11 discloses the configuration of the plate 95a which normally is provided with cupreceiving recesses 95b.

THE OPERATION

Assuming that the mold assembly M-2 is stopped in raised forming position with the crank arms 80 in the 10 o'clock position shown in FIG. 5, the next successive cycle will be initiated by a resetting timer T which, after a time delay sufficient to provide for some cooling of the formed parts C to be trimmed, engages clutch CL (connected with constantly driven motor M) to drive shaft 81. Crank arms 80 will commence to move toward the 12 o'clock position, but because the movement is initially mostly upwardly rather than to the right in FIG. 5, the effect is to raise the position of pin 80 and the right end of block 78 without contracting links 74, 77a. The effect is to rotate eccentric portion 77 slightly counterclockwisely in FIG. 5 with respect to pin axis "a" and raise links 77a upwardly. This moves platen 64, mold 46 and severing dies upwardly sufficiently to trim the parts (see FIG. 6). Further movement of the arms 80 toward the 12 o'clock position provides much more rightward than upward movement and this starts to collapse the links 74, 77a and lower mold 46. At this time, contacts 106 close to energize the clutch CL-1, which drives the shaft 27, powering the web advancing chains 19. At the same time, dancer roll 13 is operated by the arm 35 moving 180° from the down position in which it is shown in FIG. 3, to an up position and, in so doing, moving the dancer roll 13 from the "at rest" broken line position shown in FIG. 2, to the solid line position. This occurs when double acting, solenoid operated cylinders 39 and 40 are operated by contacts 107 controlled by an encoder such as shown in U.S. Pat. No. 3,814,934 or the like, which is responsible for closing and opening the various sets of contacts which operate the various components of the machine. Contacts 108 are then immediately closed by the encoder to operate cylinders 39 and 40 in the reverse direction and move roll 13 back to the down position.

During operation of the chains 19 and roll 13, as crank arms 80 move right and toward the 4 o'clock position, the links 74 and 77a will be collapsed to lower the mold 46 and platen 64. After an initial lowering movement, the plate 90 engages the springs 93 and holds the cups C in position, while the platen 64 and mold 46 continue to descend. At the same time, movement of the platen 64 downwardly causes the linkage 102, 97 and 99 to react to initially delay, as previously explained, and then to move the pusher carriage mounts 95 forwardly and cause the pusher plate 95a to push cups C over to a discharge conveyor 105. On the later movement of mold 46 upwardly, the pusher plate 95a is automatically removed from between the mold assemblies M-1 and M-2 to the FIG. 9 position by the same linkage 102, 97 and 99.

During the return movement of roll 13, a fresh length of plastic web P is pulled from the roll R and the dancer roll 13 is then halted in down position. The advancing chains 19 have finished their sheet forwarding movement and shaft 27 is halted at the time roll 13 commences to move downwardly. At this time, crank arms 80 are in the 7 o'clock position and the mold 46 (which reached down position when crank arms 80 were in the 4 o'clock position) has moved upwardly, to a considerable extent, the links 74 and 77a expanding as the crank arms 80 moved leftward. When the crank arms 80 reach the 10 o'clock position where the links 74, 77a are fully expanded, drive shaft 81 is braked and halted.

At this time, the mold 46 has been raised to a position of substantial engagement with the plastic web P and contacts 109 are made to operate cylinder 52 and cause the plug assists 49 to move areas of the heated deformable plastic into the mold cavities 47. At about the time plug assists 49 reach their lowermost positions, contacts 110 are made and the air valve 56 operates to release air under pressure to passages 48 to complete moving the deformable plastic web portions into intimate engagement with the contours of the mold cavities 47. Contacts 109a are then made by the encoder to move cylinder 52 and piston rod 51 upwardly and raise the plug assists 49. The crank arms 80 remain at rest in the 10 o'clock position until the next cycle is commenced. Because the mold closing and opening motion is crank-operated, via cranks 80, the acceleration and deceleration is gradual, and the problems incident to sudden starts and stops do not occur. The machine is accordingly considerably more trouble-free than much of the prior art machinery.

In the set-up of the machine, and until all of the various parts are aligned and the operation is "proved", it is often desirable to eliminate the severing in place operation, such that the entire web with the cups formed therein proceeds to the scrap grinder. The operator need merely press a push button 111 which operates each cylinder 83 and retracts the piston rod 85 of each. Since crank arms 80 cannot move, this retraction causes each block 78 and eccentric pin portion 77 to swing downwardly (clockwisely in FIG. 5) about an axis "a" and lowers the links 77a just sufficiently so that movement of the crank arms 80 away from the 10 o'clock position toward the 12 o'clock position will not cause sufficient upward movement of the mold 46 and severing rings 61 to sever the parts formed. The position of links 74 does not change when the position of eccentric portion 77 is changed. When the operator desires to again include the trim-in-place feature, it is only necessary to release push button 111 and permit the single acting cylinders 83 to return to the FIG. 5 position.

While one embodiment of the invention has been described in detail, it will be apparent to those skilled in the art the disclosed embodiment may be modified. Therefore, the foregoing description is to be considered exemplary, rather than limiting, and the true scope of the invention is that defined in the following claims.

What is claimed is:

1. A differential pressure, thermoforming machine for molding articles in thermoplastic material comprising:
   a. a frame;
   b. a mold station incorporated in said frame, said mold station including a female mold mechanism with cavity forming means and an opposed mold mechanism;
   c. a longitudinally extending, web advancing mechanism for indexing a plastic web, in which products are to be formed, between said mold mechanisms;
   d. means for relatively moving said female and opposed mold mechanisms between mold open and mold closed positions on opposite sides of said plastic web;
   e. a roll stand upstream from said mold station for supporting a roll of the plastic web in a position aligned longitudinally with said mold station such that a supply of the web can be unwound from the roll and fed to the web advancing mechanism;
   f. heater elements disposed between the roll stand and mold station for heating the web to a moldable state;
   g. a dancer arm assembly movable in an oscillating path angularly to the longitudinal extent of said advancing mechanism and said web to pull a section of said web from the roll such as to form a loop of predetermined extent and then release it for movement in indexed increments to the mold station;
   h. means mounting said dancer arm assembly for swinging movement about a generally horizontal axis extending transversely to the web;
   i. a crank link having a first end connected to the dancer arm assembly for moving said dancer arm assembly in an oscillating path;
   j. a drive crank pivotally connected to said link oscillatable through substantially half an arc of revolution for moving said crank link through part of a revolution wherein said crank link drives said dancer arm assembly first at a gradually accelerating speed, then at increased speed, and finally at a gradually decelerating speed, when said dancer arm assembly is moved both in a direction to release the web to the advancing mechanism and then away from the web to pull a further increment of web from the roll; and
   k. drive means for moving said drive crank in correlation with said web advancing mechanism.

2. The machine of claim 1 wherein said drive means for moving said drive crank comprises a spur gear, at least one rack in mesh engagement, with said spur gear, and separate power cylinders powering said rack in correlation with said web advancing mechanism to revolve said gear first in one direction of rotation when the advancing mechanism is operating, and then in a return direction.

3. A differential pressure, thermoforming machine for molding articles in thermoplastic material comprising:
   a. a frame;
   b. a mold station incorporated in said frame, said mold station including a female mold mechanism with cavity forming means and an opposed mold mechanism;
   c. a longitudinally extending, web advancing mechanism for indexing a plastic web in which products are to be formed between said mold mmechanisms;
   d. means for relatively moving said female and said opposed mold mechanisms between open and closed positions on opposite sides of said plastic web;

e. severing knife means around said cavity forming means cooperable with a final increment of said relative movement to dispose said mechanism in a closed position to sever the products formed from the web;

f. said means for relatively moving said mold mechanisms including a drive gear for causing relative movement to dispose said mold mechanisms in a forming position, and a final most-closed position in which severing of the articles by said severing knife means is accomplished;

g. a ejector pin mechanism operable after severing is accomplished and there has been relative movement of said mold mechanisms toward open position to eject the product from the cavity forming means; and h. pusher means connected to be operated by said relative movement of one of said mold mechanisms to push the ejected product in a direction to clear the mold station.

4. A thermoforming machine for molding articles in thermoplastic material comprising:

a. a frame;

b. a mold station incorporated in said frame, said mold station including a mold assembly comprising a female mold mechanism with cavity forming means, and an opposed mold mechanism;

c. a web advancing mechanism for disposing a plastic web, in which products are to be formed, between said mold mechanisms;

d. means for relatively moving said female and said opposed mold mechanisms between open and closed positions on opposite sides of said plastic web;

e. said means for relatively moving said female and said opposed mold mechanisms including expandible and contractible toggle links connected between said frame and one of said mold mechanisms, and drive means incorporating a motion transfer mechanism for relatively expanding and contracting said toggle links operable to expand said toggle links and move said one mold mechanism toward the other mold mechanism to a first forming position, and then to expand said toggle links a final increment to move said one mold mechanism a final increment toward the other mold mechanism to a severing position;

f. severing knife means carried by said mold assembly around said cavity forming means cooperable with said final increment of expansion to sever the products formed from the web;

g. said motion transfer mechanism including relatively repositionable, toggle link expanding, coupled parts operative in one relative position to transfer the motion of said drive means to cause expansion of said toggle links to move said one mold mechanism to said first forming position and then to cause further expansion of said toggle links to move said one mold mechanism to said severing position; said repositionable toggle link expanding, coupled parts being operative in a second relative position to move said one mold mechanism to said first forming position and to disable the said further expansion of said toggle links necessary to reach severing position; and h. position changing mechanism actuable for repositioning said parts between said first and second relative positions.

5. The machine of claim 4 wherein said drive means is controlled to drive said motion transfer mechanism through a continuous cycle commencing with said expansion of said toggle links a final increment to move said one mold mechanism to severing position, thence proceeding with contraction of said toggle links to move said one mold mechanism to a position removed from said other mold mechanism to permit operation of said web advancing mechanism, and terminating in expansion of said toggle links to move said one mold mechanism to said first forming position.

6. The machine of claim 4 wherein an ejector pin mechanism is mounted by said mold mechanism and operable, after severing and movement of said one mold mechanism away from said other mold mechanism, to eject the product from the cavity forming means; and pusher means is connected to be operated by said movement of said one mold mechanism to push the severed and ejected product in a direction to clear the mold station.

7. The machine of claim 4 wherein said position changing mechanism comprises a power cylinder carried by one of said repositionable parts and connected to the other.

8. The machine of claim 4 wherein said toggle links are revolvably coupled by a coupling pin and said parts include a connecting rod connected to said coupling pin and driven in a path to push said toggle link connecting pin to expand and contract said links.

9. The machine of claim 4 wherein said repositionable toggle link expanding coupled parts include a revolvable pin connecting said toggle links which includes an eccentric portion rotatably received by one of said toggle links such that revolving movement of said eccentric portion in one direction causes said further expansion of said toggle links, and a connecting rod coupled with said eccentric portion and to said drive means.

10. The machine of claim 9 wherein said connecting rod is driven in a path to push said pin bodily in a direction to contract and expand said toggle links, and also to revolve said pin.

11. The machine of claim 10 wherein said position changing mechanism includes a power cylinder connected between said revolvable pin and connecting rod to alter the motion transfer of said revolvable pin and said connecting rod by relatively pivoting said revolvable pin in the opposite direction.

12. A thermoforming machine for molding articles in thermoplastic material comprising:

a. a frame;

b. a mold station incorporated in said frame, said mold station including a mold assembly comprising a female mold mechanism with cavity forming means, and an opposed mold mechanism;

c. a mechanism for disposing a plastic web, in which products are to be formed, between said mold mechanisms;

d. means for relatively moving said female and said opposed mold mechanisms between open and closed positions on opposite sides of said plastic web;

e. said means for relatively moving said female and said opposed mold mechanisms including expandible and contractible, pivotally coupled toggle links connected between said frame and one of said mold mechanisms, and drive means incorporating a motion transfer mechanism for relatively expanding and contracting said toggle links operable to expand said toggle links and move said one mold mechanism toward the other mold mechanism to a first forming position, and then to expand said toggle links a final increment to move said one mold mechanism a final increment toward the other mold mechanism to severing position;

f. severing knife means carried by said mold assembly around said cavity forming means cooperable with said final increment of expansion to sever the products formed from the web;

g. said motion transfer mechanism including a revolvable pin connecting said toggle links which includes an eccentric portion rotatably received by one of said coupled toggle links such that revolving movement of said eccentric portion in one direction causes further expansion of said toggle links, coupled with a connecting rod connected with said drive means to transfer the motion of said drive means to first cause expansion of said toggle links to move said one mold mechanism to said first forming position and then to cause further expansion of said toggle links to move said one mold mechanism to said severing position via rotation of said pin.

13. The improved invention of claim 12 wherein said drive means comprises a crank arm connected to one end of said connecting rod and moving it in a path to push said pin bodily in a direction to contract and expand said links, and to also revolve said pin.

* * * * *